United States Patent [19]

McDermott

[11] 4,007,586
[45] Feb. 15, 1977

[54] SPIN NOZZLE AND THRUST AUGMENTOR MECHANISM

[75] Inventor: Joseph J. McDermott, Huntsville, Ala.

[73] Assignee: The United States of America as represented by the Secretary of the Army, Washington, D.C.

[22] Filed: Nov. 10, 1975

[21] Appl. No.: 630,114

[52] U.S. Cl. .................................. 60/201; 60/271; 239/265.17; 244/3.23
[51] Int. Cl.² .......................................... F02K 1/24
[58] Field of Search ............ 60/231, 228, 271, 201; 239/127.3, 265.17; 244/3.23

[56] References Cited
UNITED STATES PATENTS

| 2,518,002 | 8/1950 | Goddard | 60/201 |
| 2,523,011 | 9/1950 | Goddard | 60/201 |
| 2,968,996 | 1/1961 | Strickland et al. | 244/3.23 |
| 3,166,897 | 1/1965 | Laurence et al. | 239/265.17 |
| 3,481,543 | 12/1969 | Lovingham | 239/127.3 |

FOREIGN PATENTS OR APPLICATIONS

| 1,060,291 | 11/1953 | France | 239/265.17 |
| 1,188,450 | 3/1956 | France | 239/265.17 |
| 795,652 | 5/1958 | United Kingdom | 239/265.17 |

Primary Examiner—Carlton R. Croyle
Assistant Examiner—Robert E. Garrett
Attorney, Agent, or Firm—Nathan Edelberg; Robert P. Gibson; Charles R. Carter

[57] ABSTRACT

A spin nozzle system for imparting a thrust to pre-spin a missile prior to launching. This system includes locating the spin nozzles within the outside diameter of the main missile motor. Also the nozzle exhaust gases are exited into the main motor exhaust cone to thereby augment the total missile thrust.

3 Claims, 2 Drawing Figures

SPIN NOZZLE AND THRUST AUGMENTOR MECHANISM

DEDICATORY CLAUSE

The invention described herein may be manufactured, used, and licensed by or for the Government for governmental purposes without the payment to me of any royalties thereon.

BACKGROUND OF THE INVENTION

This invention relates to the field of missile spin nozzles. Previous spin nozzles are located outside the diameter of the main missile motor and the exhaust gases are externally exhausted 90° from the longitudinal axis of the missile to the atmosphere. This location of nozzles has lead to impaired directional control of the missile in addition to a loss of spent energy.

SUMMARY OF THE INVENTION

The present invention has improved the directional control of a pre-spun missile as well as providing a means whereby spent spin exhaust gases can be utilized to increase the main missile thrust.

This invention can be better understood from the following detailed description taken in conjunction with the accompanying drawing.

DESCRIPTION OF THE PREFERRED EMBODIMENT

Figure 1:
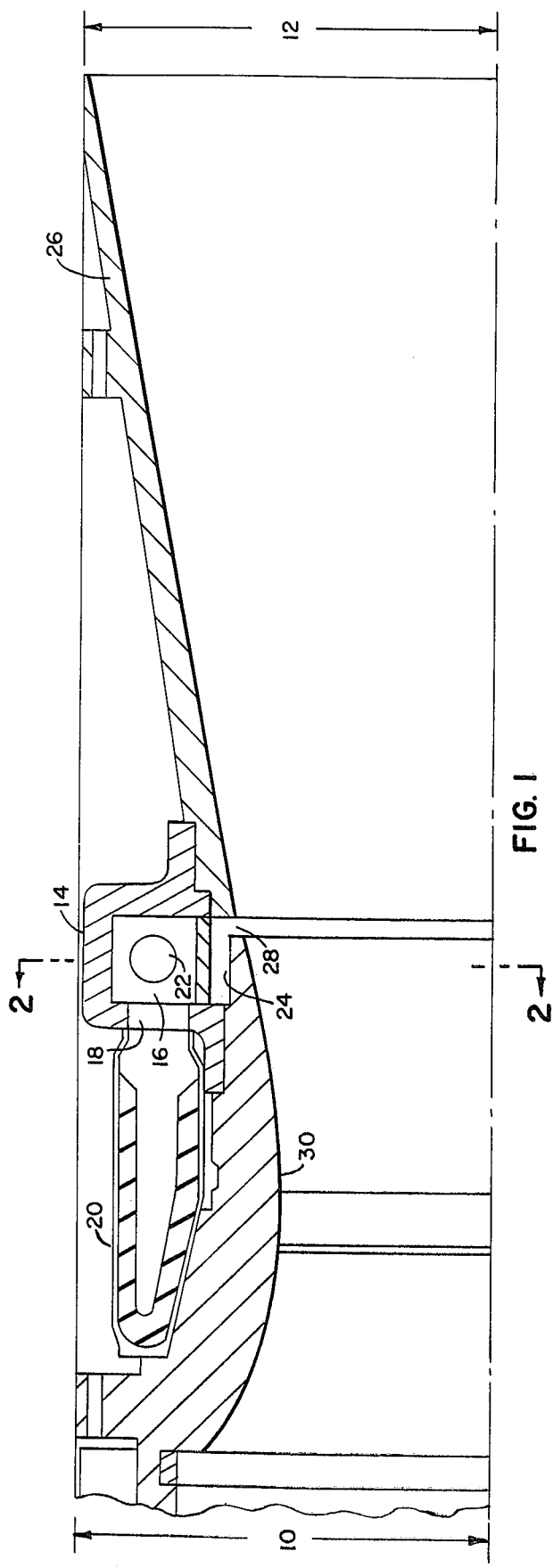
FIG. 1 is a side elevation, partially cut away, of the missile spin nozzles and thrust augmentor.
Figure 2:
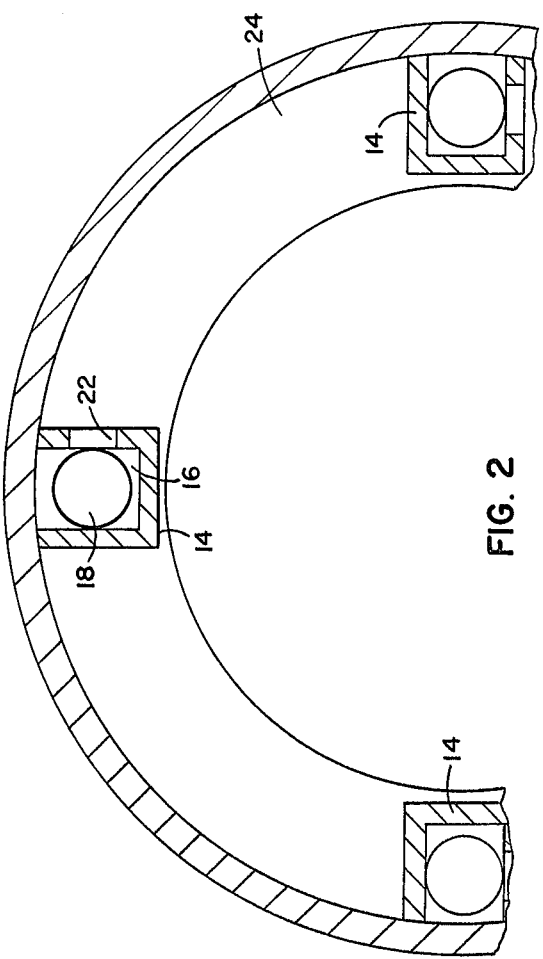
FIG. 2 is a view of the spin chamber taken along line 2—2 of FIG. 1.

As can be seen in FIG. 1 reference numeral 10 identifies the main motor diameter while reference numeral 12 shows the motor exhaust cone diameter. For optimum motor thrust it is essential that these diameters be as evenly matched as possible. Reference numeral 14 shows a spin nozzle which includes a chamber 16 connected through an inlet opening 18 to a spin power source 20. This source may be of the high pressure fuel type or a hot gas generator. An exit outlet 22 provided in the nozzle connects the spin nozzle with a plenum chamber 24, more clearly shown in FIG. 2. The nozzle outlet 22 is smaller in size than inlet 18 to compress the gas as it leaves chamber 16. Communication between the plenum chamber 24 and motor exhaust cone 26 is provided by a circumferential opening 28.

In operation, a mechanism (not shown) is operated to cause spin fuel or gas from source 20 to enter spin nozzle 14. The high pressure fuel or gases compresses through outlet 22 causing a counterclockwise thrust reaction force on nozzles as viewed in FIG. 2 to impart a spin to the missile. The gases leaving outlet 22 enter plenum chamber 24 and are bled off through opening 28 into the motor exhaust cone 26. The high velocity of the main motor exhaust gases pulls a vacuum on opening 28 and sucks the spin exhaust gases into the main exit cone to thereby augment the missile thrust.

I claim:

1. A spin and thrust augmentor mechanism for pre-spinning a missile prior to launching and increasing total missile thrust comprising: a missile having a main motor diameter of the same diameter as the motor exhaust exit cone; a plurality of spin nozzles disposed within and around said main motor diameter, said nozzles including a chamber provided with a fuel or gas inlet and an exit outlet, said nozzle exit outlet being smaller in size than said nozzle inlet to compress gas exiting therefrom and a plenum chamber disposed to collect the spin exhaust gases from all of said nozzles and to direct said gases into the motor exhaust cone to increase missile thrust.

2. A spin and thrust augmentor as set forth in claim 1 wherein said spin nozzles are provided with a source of spin power.

3. A spin and thrust augmentor as set forth in claim 2 wherein said plenum chamber is provided with a circumferential opening to connect said chamber with said motor exhaust cone.

* * * * *